(12) United States Patent
Tabarovsky

(10) Patent No.: US 8,773,135 B2
(45) Date of Patent: Jul. 8, 2014

(54) RESISTIVITY IMAGING USING PHASE SENSITIVE DETECTION WITH A FLOATING REFERENCE SIGNAL

(75) Inventor: Leonty A. Tabarovsky, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 181 days.

(21) Appl. No.: 13/307,842

(22) Filed: Nov. 30, 2011

(65) Prior Publication Data

US 2012/0068713 A1 Mar. 22, 2012

Related U.S. Application Data

(62) Division of application No. 12/201,154, filed on Aug. 29, 2008, now Pat. No. 8,098,071.

(60) Provisional application No. 60/966,707, filed on Aug. 29, 2007.

(51) Int. Cl.
 *G01V 3/20* (2006.01)
(52) U.S. Cl.
 USPC .......................................................... 324/367
(58) Field of Classification Search
 USPC .......................................................... 324/367
 See application file for complete search history.

(56) References Cited

U.S. PATENT DOCUMENTS

| 3,462,679 A * | 8/1969 | Georges ........................ 324/375 |
| 4,398,151 A * | 8/1983 | Vinegar et al. ................ 324/323 |
| 5,467,832 A | 11/1995 | Orban et al. |
| 6,191,588 B1 | 2/2001 | Chen |
| 6,373,248 B1 | 4/2002 | Poitzsch et al. |
| 7,888,941 B2 * | 2/2011 | San Martin et al. .......... 324/366 |
| 8,098,071 B2 | 1/2012 | Tabarovsky |

FOREIGN PATENT DOCUMENTS

WO     00/04405 A1    1/2000

* cited by examiner

*Primary Examiner* — Bot Ledynh
(74) *Attorney, Agent, or Firm* — Arnold, Knobloch & Saunders, L.L.P.; Charles Knobloch

(57) ABSTRACT

A device, method and system for measuring characteristics of a geologic formation using a floating reference signal having a mud chamber, an electrode disposed within the mud chamber, and an electrically conductive plate disposed within the mud chamber, the plate separated from the electrode. An alternating current source is provided on the electrode, whereby an electric field is be maintained between the electrode and the conductive plate. An opening in the mud chamber allows drilling fluids to pass there through.

17 Claims, 5 Drawing Sheets

RESISTIVITY IMAGING USING PHASE SENSITIVE DETECTION WITH A FLOATING REFERENCE SIGNAL

STATEMENT OF RELATED CASES

This instant application is a divisional of prior non-provisional application Ser. No. 12/201,154, filed Aug. 29, 2008, still pending, which claims the benefit of prior U.S. Provisional Application No. 60/966,707, filed Aug. 29, 2007.

FIELD OF THE INVENTION

The present invention relates generally to a device, method, and system for the downhole measurement of the characteristics of a geologic formation and, in a particular though non-limiting embodiment, to a device, method, and system for resistivity imaging in oil-base mud.

BACKGROUND OF THE INVENTION

Galvanic imaging devices utilizing impedance measurements in oil-base mud are very sensitive to the oil-filled gap between the electrode surface and the geologic formation. Multiple attempts have been made to eliminate the problem and are known in the prior art.

Typically, an imaging tool contains a series of small buttons mounted on a metal pad and separated by narrow insulating gaps. The buttons serve as electrically conducting electrodes. In oil-base mud, the measured impedance of individual buttons depends to a large extent on the mud cake parameters. In addition, an oil film on the pad surface may completely eliminate the electrical contact between pad and formation.

In conductive mud, the mud cake has low resistivity and, consequently, is almost transparent to the current flowing through it. In oil-base mud, the mud cake is very resistive, contributing greatly to the measured ground resistance. Therefore, the true value of formation resistivity is significantly obscured. In addition, a thin oil film may cover the surface of the pad, making the overall ground resistance so large that it is practically impossible to inject sufficient current into the formation.

The size of a button is associated with the tool spatial resolution. Usually, the button radius is in the range of 1 to 2 mm, creating a very large ground resistance. For example, a 2 mm button on a typical focusing pad has a ground resistance of 10,000 Ohm in a 1 Ohm-m formation or 10,000,000 Ohm in a 1,000 Ohm-m formation. This illustrates the technical challenge of producing a high definition image in a resistive-mud environment.

In the present invention, a new principle is introduced based on phase sensitive detection with the phase established with respect to a floating reference. The floating reference represents the electric field in the gap. Mud-filled chambers in front of the electrodes are used to measure the reference field.

SUMMARY OF THE INVENTION

According to a first set of examples of the present invention, there is provided a device for measuring characteristics of a geologic formation using a floating reference signal, the device including: a mud chamber; an electrode disposed within the mud chamber; an electrically conductive plate disposed within the mud chamber, the plate separated from the electrode, whereby an electric field may be maintained between the conductive plate and the electrode; and an opening in the mud chamber, thereby allowing drilling fluids to pass there through.

According to another example of the invention, the above-described device further comprises an alternating current source, the alternating current source in electrical connection with the electrode.

According to another example of the invention, the plate of the above-described device is an electrically conductive lattice.

According to another example of the invention, the distance of separation between the electrode and the plate is less than the smallest lineal surface dimension of the electrode.

According to another example of the invention, there is provided a device for measuring characteristics of a geologic formation in a wellbore using a floating reference signal, the device including: a plurality of electrodes; a plurality of electrically conductive plates, each of the plurality of electrically conductive plates positioned respective to at least one of the plurality of electrodes, where the plates of the plurality of electrically conductive plates are separated from each other by an insulating material; and a mud chamber located between the plurality of electrodes and the plurality of electrically conductive plates. The plurality of electrodes and the plurality of plates are electrically isolated from each other except through any contents contained in the mud chamber and the mud chamber is in fluid communication with the wellbore, allowing wellbore fluids to pass there through.

According to a second set of examples of the present invention, there is provided a method for characterizing a geologic formation including the steps of: determining the electrical properties of a current introduced into the geologic formation from a wellbore, thereby producing a formation measurement; determining, through a portion of the wellbore, the electrical properties of that current introduced into the geologic formation, thereby producing a reference signal; and differentiating the produced formation measurement from the produced reference signal.

According to another example of the invention, the differentiation step of the above-described method includes the step of determining the phase difference between the produced formation measurement and the produced reference signal.

According to another example of the invention, the step of determining the phase difference between the formation measurement and the reference signal includes the step of measuring the voltage of the introduced current when the voltage of the reference signal is approximately zero.

According to another example of the invention, the differentiation step of the above-described method comprises: determining the impedance amplitude of the produced formation measurement.

According to another example of the invention, the differentiation step of the above-described method includes: determining the phase difference between the formation measurement and the reference signal, whereby a measurement of the phase difference is produced; and selecting between measurement of the phase difference between the formation measurement and the reference signal for large phase differences and measurement of the impedance amplitude of said formation measurement for small phase differences, producing a characterization of the geologic formation.

According to another example of the invention, the introduced current is provided through at least one of a plurality of electrodes disposed in the wellbore. In another example, the introduced current is an alternating current.

According to another example of the invention, the step of determining the electrical properties of a current introduced into the geologic formation from a wellbore includes the steps of: introducing an alternating electrical current into the wellbore using an electrode in electrical contact with the wellbore fluids, thereby inducing a current into the geologic formation; measuring the alternating voltage of the introduced alternating electrical current, thereby producing a first measured voltage; and measuring the current of the introduced alternating electrical current, thereby producing a first measured current. The step of determining the electrical properties of the current introduced into the geologic formation through a portion of said wellbore includes the step of measuring the differential alternating voltage of the introduced alternating electrical current between the electrode and an electrically conductive plate disposed between the electrode and the geologic formation, thereby producing a second measured voltage.

In a further example, the step of differentiating the formation measurement from the reference signal includes the step of correlating the first measured voltage with the second measured voltage, thereby producing a phase shift measurement. In another example, the step of differentiating the formation measurement from the reference signal includes the step of dividing the first measured current into the first measured voltage when the non direct current component of the second measured voltage is approximately zero. In another example, the step of differentiating the formation measurement from the reference signal includes the step of selecting at least between: correlating the first measured voltage with the second measured voltage, thereby producing a phase shift measurement; and dividing the first measured current into the first measured voltage when the non direct current component of the second measured voltage is approximately zero.

According to a third set of examples of the present invention, there is provided a system for characterizing a geologic formation including: a first determining means for determining the electrical properties of a current introduced into the geologic formation from a wellbore, thereby producing a formation measurement; a second determining means for determining the electrical properties of that current introduced into the geologic formation through a portion of the wellbore, thereby producing a reference signal; and a means for differentiating the produced formation measurement from the produced reference signal, thereby producing a characterization of the geologic formation.

According to another example of the invention, the differentiation means of the above-described system comprises a means for measuring the phase difference between the produced formation measurement and the produced reference signal.

According to another example of the invention, the differentiation means of the above-described system includes a means for measuring the impedance amplitude of the produced formation measurement. In a further example of the invention, the means for measuring the impedance amplitude of the produced formation measurement includes measuring the voltage of that introduced current when the voltage of the produced reference signal is approximately zero.

According to another example of the invention, the differentiation means of the above-described system includes a means for selecting between: a means for measuring the phase difference between the produced formation measurement and the produced reference signal for large phase differences; and a means for measuring the impedance amplitude of the produced formation measurement for small phase differences.

According to another example of the invention, the second determining means of the above-described system includes: a mud chamber located between an electrode and a plate, the electrode and the plate electrically isolated from each other except through any contents contained in the mud chamber; and the mud chamber in fluid communication with the wellbore, thereby allowing wellbore fluids to pass there through. In a further example of the invention, the distance of separation between the electrode and the plate is less than the smallest lineal surface dimension of the electrode.

According to another example of the invention, the second determining means of the above-described system includes: a mud chamber located between a plurality of electrodes and a plate, the plurality of electrodes and the plate electrically isolated from each other except through any contents contained in the mud chamber; and the mud chamber in fluid communication with the wellbore, thereby allowing wellbore fluids to pass there through.

According to another example of the invention, the second determining means of the above-described system includes: a mud chamber located between a plurality of electrodes and a plurality of electrically conductive plates, the plurality of plates separated from each other by an insulating material; each of the plurality of plates positioned respective to at least one of the plurality of electrodes; the plurality of electrodes and the plurality of plates electrically isolated from each other except through any contents contained in the mud chamber; and the mud chamber in fluid communication with the wellbore, thereby allowing wellbore fluids to pass there through. In a further example of the invention, the introduced current is provided through at least one of the plurality of electrodes disposed in the wellbore. In a further example of the invention, the introduced current is an alternating current.

According to another example of the invention, the first determining means of the above-described system includes: introducing an alternating electrical current into the wellbore using an electrode in electrical contact with the wellbore fluids, thereby inducing a current into the geologic formation; measuring the alternating voltage of the introduced alternating electrical current, thereby producing a first measured voltage; and measuring the current of the introduced alternating electrical current, thereby producing a first measured current. The second determining means includes: an electrically conductive plate disposed between the electrode and the geologic formation; and measuring the differential alternating voltage of the introduced alternating electrical current between the electrode and the electrically conductive plate, thereby producing a second measured voltage. In a further example of the invention, the differentiating means includes correlating the first measured voltage with the second measured voltage, thereby producing a phase shift measurement. In a further example of the invention, the differentiating means includes dividing the first measured current into the first measured voltage when the non direct current component of the second measured voltage is approximately zero. In a further example of the invention, the differentiating means includes selecting at least between: correlating the first measured voltage with the second measured voltage, thereby producing a phase shift measurement; and dividing the first measured current into the first measured voltage when the non direct current component of the second measured voltage is approximately zero.

BRIEF DESCRIPTION OF THE SEVERAL DRAWINGS

DETAILED DESCRIPTION

Each of FIGS. 1-8 illustrates a geologic formation characterization system embodying various aspects of the present invention, though these particular embodiments are illustrated and described herein only for exemplary purposes. Moreover, variations of the geologic formation characterization system and methods of utilizing the same will become apparent to those of ordinary skill in the relevant structural and mechanical arts upon reading the following disclosure. Thus, the present invention is not to be considered limited to only the structures, systems, and methods described herein.

Figure 1:
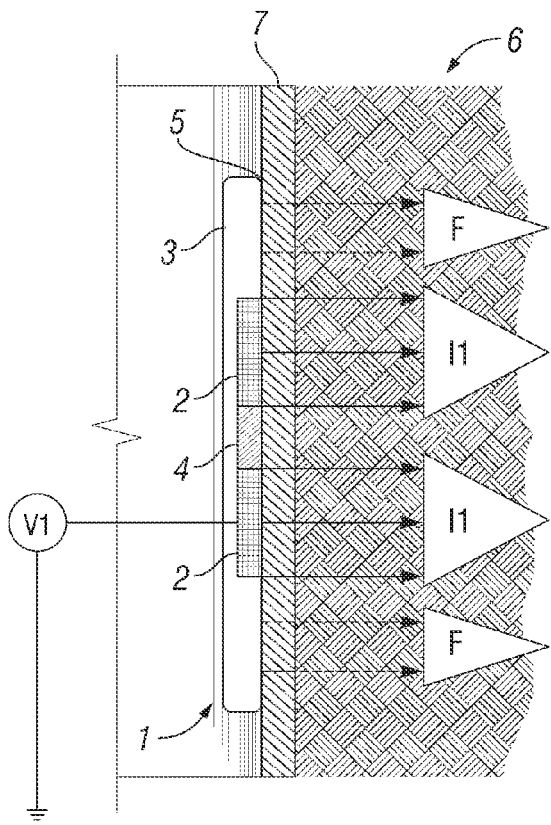
FIG. 1 is a schematic view of a representative imaging tool in a wellbore having an oil-filled gap 7.

As illustrated in FIG. 1, an imaging tool 1 having small buttons 2 is mounted on a metal pad 3 and separated by narrow insulating gaps 4. Pad 3 is pushed against the borehole wall 5. Borehole wall 5 is formed by piercing geologic formation 6. An oil-filled gap 7 may remain between pad 3 and formation 6. A Voltage V1 is created on the face of pad 3, allowing a current I1 to be injected into formation 6. A current F, flowing from the periphery of pad 3 focuses currents I1 emanating from buttons 2. The ground impedance Z of buttons 2 may be related to the formation resistivity, $R_t$, as follows:

$$R_t = Z/K; Z = V/I \qquad \text{(Eq. 1)}$$

Here, K represents the button resistance in a uniform formation with 1 Ohm-m resistivity, the K-factor. In oil-base mud, the measured impedance of individual buttons strongly depends on the quality of pad contact with the formation and the size of any oil-filled gap 7 which may exist. Eq. 1 may result in a resistivity significantly different from the true formation resistivity.

Certain measurement principles may be established for detection of formation resistivity independent of the oil-filled gap thickness, resistivity, and other properties affecting the gap impedance. For example, it is assumed that the return electrode is very large compared to the injection buttons 2 such that the ground impedance of the return may be neglected.

Figure 2:
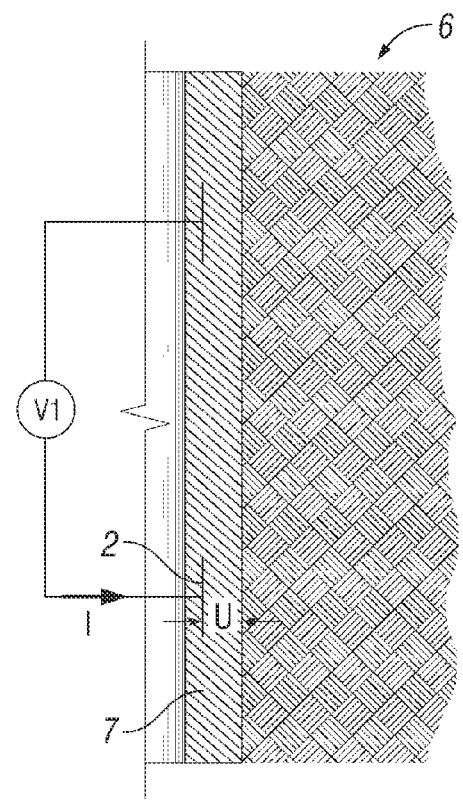
FIG. 2 is a schematic view of measurement of voltage potential U in an oil-filed gap 7 in a wellbore.
Figure 3:
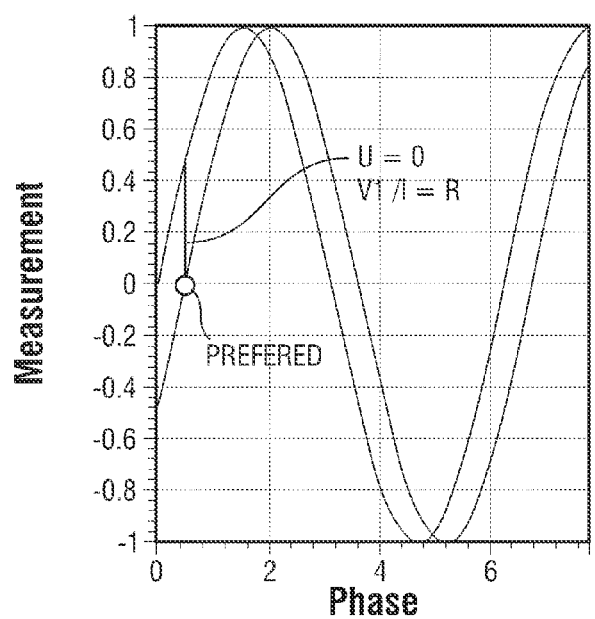
FIG. 3 is an electrical measurement graph illustrating phase differences between introduced voltage V1 and voltage potential U in an oil-filed gap 7.

Additional principles are summarized in FIG. 2 and FIG. 3. An injected voltage V1 is introduced into button 2, injected voltage V1 oscillating in time with a high frequency of $\omega = 2\pi f$ and otherwise providing a current I. All physical quantities follow a sinusoidal pattern in time with different phase delays. The phase delays are functions of formation resistivity, tool design, and other characteristics of the overall system.

Any quantity, including voltage and current, can be measured at a particular moment in time. The selection of time may be critical for providing sensitivity of the measurement to the desired formation properties or elements. For example, in induction logging, the measurements of the magnetic field are performed at such a moment when the current in the transmitter equals to zero. Such a selection of time for measurements removes a very strong "primary field" from the signal and provides the best sensitivity of the measured field to formation conductivity. The transmitter current is said to be "a reference signal", and the measurements are considered to be performed "out-of-phase" with the reference signal. An important property of the reference signal in induction logging is that the reference signal does not depend on the formation properties, exhibiting a very high accuracy over a range of variation in formation properties.

In the present invention, it is optimum to perform measurements of the current and voltage at such a time when the voltage U across the oil-filled gap 7 equals zero. At such a moment, the impedance of buttons 2 does not depend on the properties of gap 7, including the thickness, resistivity, and dielectric permittivity of gap 7. At such moment, voltage U may be used as a reference.

Selecting voltage U as a reference eliminates the influence of oil-filled gap 7 directly in the measurements. However, voltage U is not easy to measure. In principle, what needs to be measured and used as a reference is the electric field in gap 7. Conceivably, to achieve such a measurement, a small electric antenna could be disposed perpendicular to the electrode surface. If such an antenna, or any other device capable of detecting electric field in gap 7, is feasible or exists then the proposed measurements will be almost free of the influence of gap 7. It is worth noting that the antenna should not necessarily touch formation 6.

Unlike the reference current in induction logging, a reference signal for galvanic imaging depends on the properties of formation 6 and on the properties of oil-filled gap 7. Reference signal variations are able to automatically compensate for the gap variations, providing the impedance measurements can be made that are much more sensitive to the formation resistivity.

Figure 4:
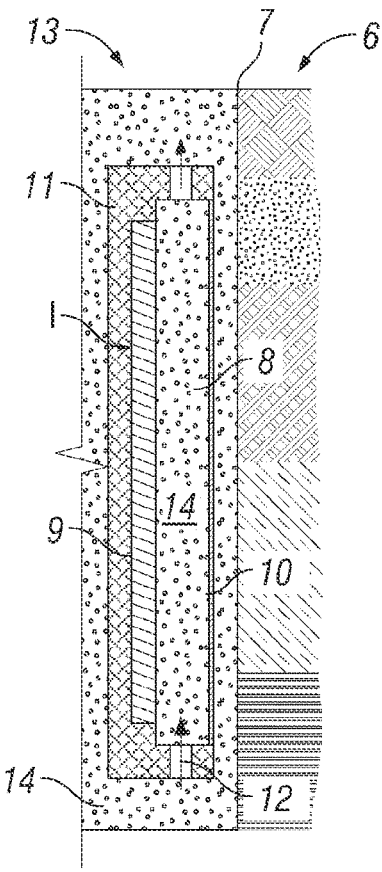
FIG. 4 is a side schematic view of an example of the present invention in a wellbore 13 with geologic formation 6.

A feasible way of measuring the reference signal is illustrated in FIG. 4. Mud chamber 8 is placed in front of measurement electrodes 9. Current I is introduced on electrode 9. Chamber 8 is confined between the surface of electrode 9 and a metal plate 10 placed in front of electrode 9. Plate 10 and electrode 9 are mounted on an insulating support frame 11. Plate 10 and electrode 9 are electrically isolated from each other. Mud chamber 8 has open channels 12 allowing for the access of mud 14 from the borehole 13. Mud 14 between electrode 9 and metal plate 10 at every logging depth is the same as in the surrounding mud in borehole 13. Other mechanisms for providing mudflow through chamber 8 may be envisioned. Preferably, the radial extent of chamber 8 is smaller than the axial and azimuthal size of electrodes 9. Under such conditions, the electric field at the location of plate 10 will be almost normal to the surface of plate 10, and consequently, metal plate 10 will be transparent with respect to the field produced by electrode 9. The electric field produced by electrode 9 in the presence of plate 10 is almost the same as without the plate.

Figure 5:
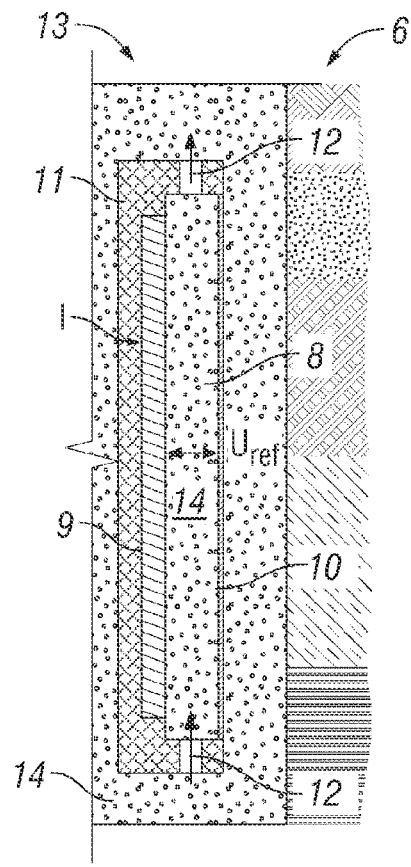
FIG. 5 is a side schematic view of an example of the present invention illustrating a measurement of voltage potential U.

As shown in FIG. 5, plate 10, together with electrode 9, provides a reference for measurement of the desired electric field $U_{ref}$ in chamber 8, representing the oil-filled gap.

Figure 6:
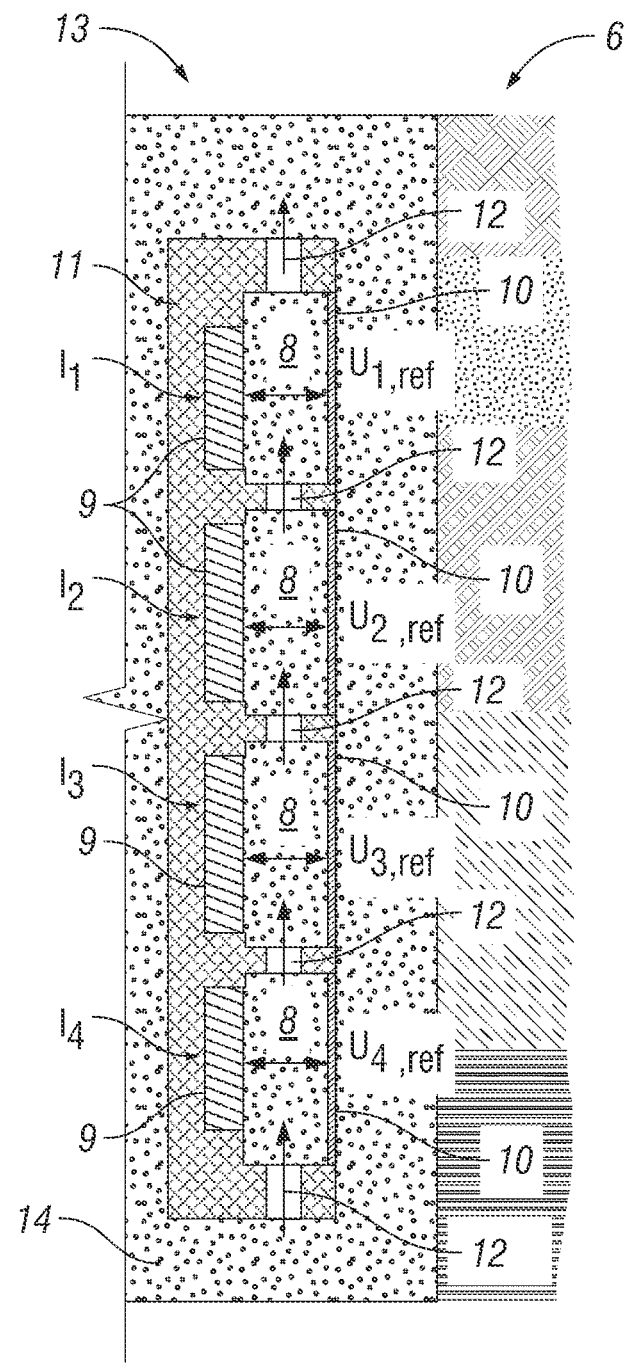
FIG. 6 is a side schematic view of an example of the present invention illustrating a plurality of electrode 9 and plate pairs 10.

As shown in FIG. 6, in a further example, individual references for each electrode 9 may be provided in a multi-electrode arrangement. Currents I1, I2, I3, I4 are introduced on each respective electrode 9. Metal plates 10 are embedded in insulating frame 11 in front of respective electrodes 9. All chambers 8 are connected via mud channels 12 such that mud 14 is able to flow through all chambers. Electric field references $U1_{ref}$, $U2_{ref}$, $U3_{ref}$, $U4_{ref}$ may be measured on each respective pair of electrodes 9 and plates 10.

Figure 7:
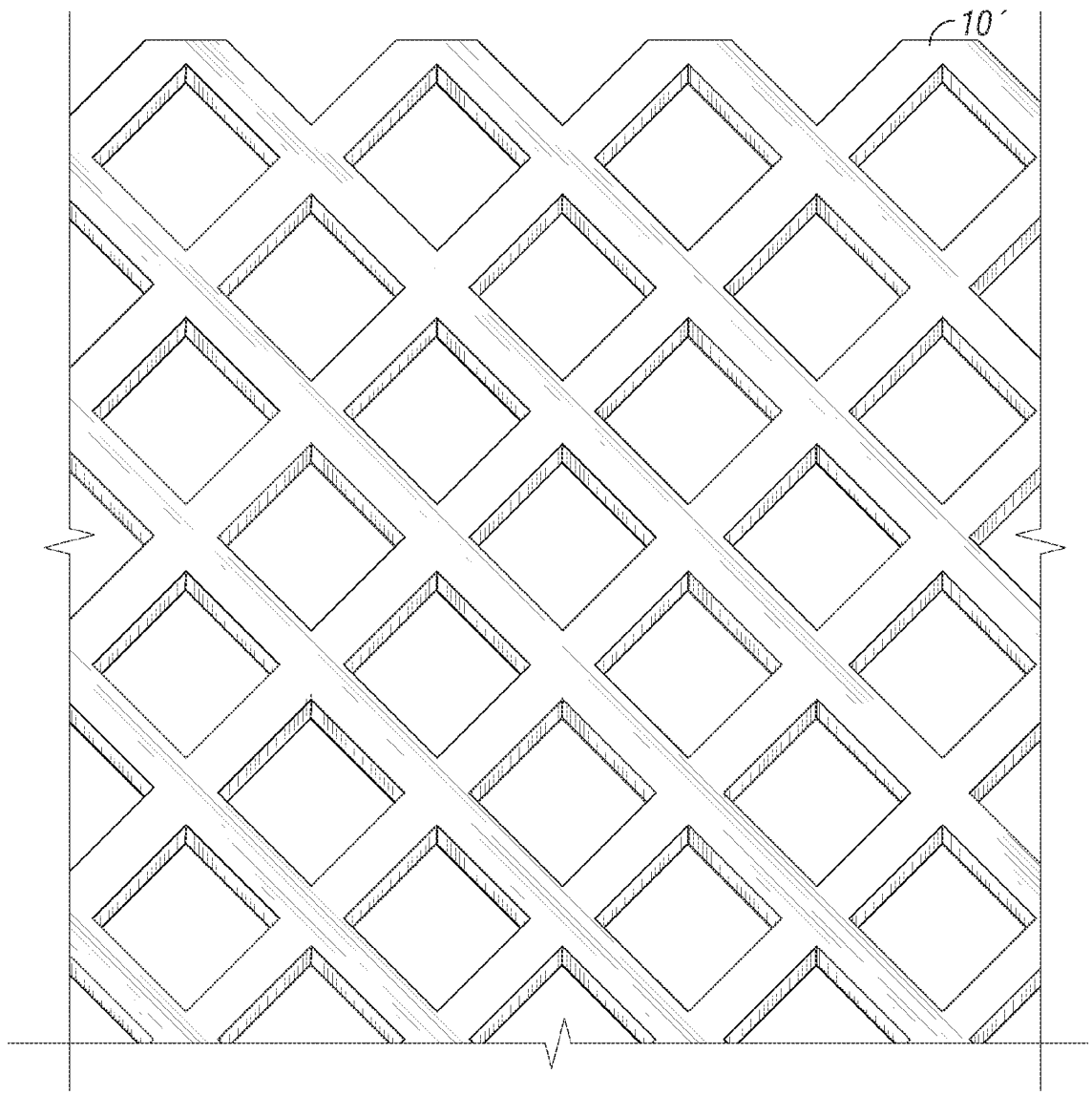
FIG. 7 is a front view of an example of a lattice 10' used for plate 10.
Figure 8:
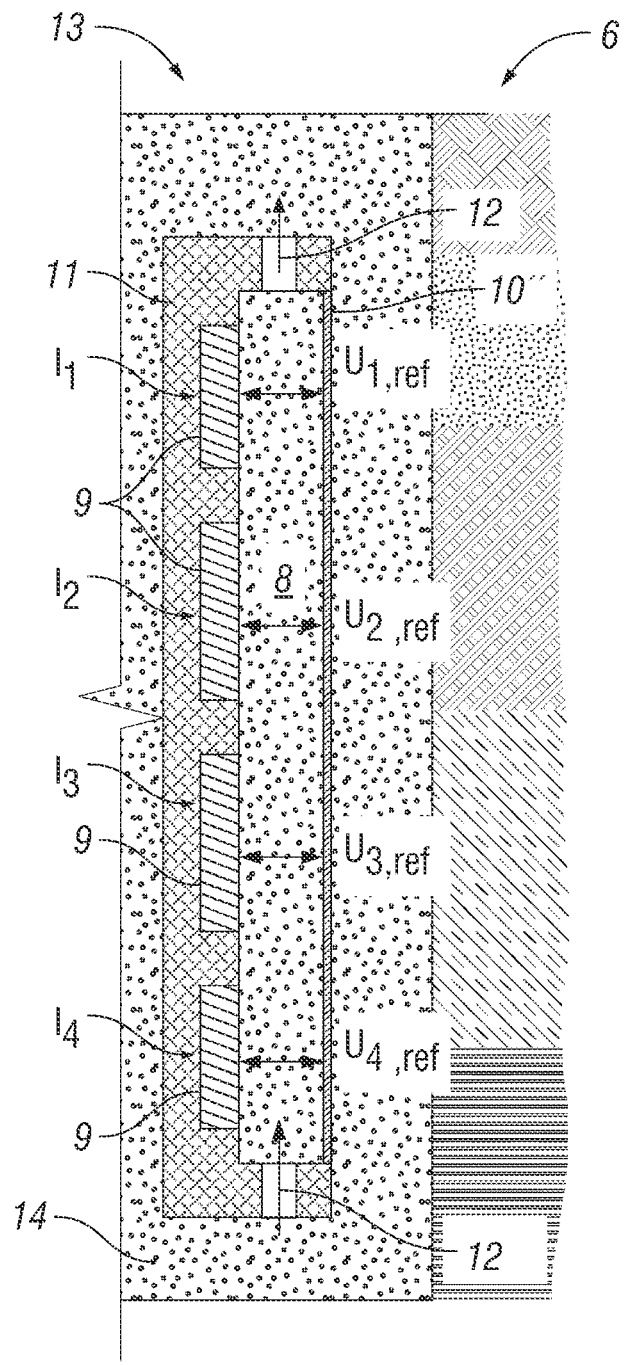
FIG. 8 is a side schematic view of an example of the present invention illustrating a plurality of electrode 9 and a single plate 10.

At high frequencies, depending on the thickness of metal plate 10, the skin-effect may be a potential problem. In a further example, a metal lattice 10', as illustrated in FIG. 7, is be used for plate 10 instead of a solid plate. In another example, such a lattice may is also used to improve the mud circulation through chambers 8.

As illustrated in FIG. 7 as a further example, a single common plate 10" for all electrodes 9 is used.

Mud chamber 8 reduces the overall capacitance in front of each electrode 9 because two capacitors are connected in series, that of mud chamber 8 and that of gap 7 between metal plate 10 and formation 6. The reduced capacitance increases overall impedance of each electrode 9. However, making the size of mud chamber 8 small in the radial direction may effectively control this effect.

The phase shift, $\Delta\phi$, between the current injected through electrode 9 and the electric field in gap 7 exactly equals, with an opposite sign, the phase of complex conductivity of the mud:

$$tg(\Delta\phi) = \omega \in / \sigma \qquad (Eq.\ 2)$$

Here, $\omega$ equals $2\pi f$, which represents the frequency of the introduced current and $\in$ represents the dielectric permittivity of the mud and $\sigma$ represents the electrical conductivity of the mud. Eq. 2 follows from the assumption that the displacement currents inside wires and electrodes or buttons may be neglected and that there is current continuity on both sides of the electrode or button, that is, inside the tool and in the wellbore fluid.

Introduced current I and electric field U in chamber 8 are measured. For large phase shifts, large $\Delta\phi$, phase sensitive detection and processing techniques are applied to determine formation characteristics, such as formation resistivity, $R_t$. For small phase shifts, small $\Delta\phi$, the impedance amplitudes are used to characterize the formation. This technique is applicable for both water and oil-base mud.

The foregoing description is presented for purposes of illustration and description, and is not intended to limit the invention to the forms disclosed herein. Consequently, variations and modifications commensurate with the above teachings and the teaching of the relevant art are deemed to reside within the spirit and scope of the invention as claimed and described.

What is claimed is:

1. A method for characterizing a geologic formation comprising the steps of:
   determining the electrical properties of a current introduced into the geologic formation from a wellbore, thereby producing a formation measurement;
   determining the electrical properties of said current introduced into the geologic formation through a portion of said wellbore, thereby producing a reference signal; and
   differentiating said formation measurement from said reference signal;
   wherein said differentiation step comprises the steps of:
      determining the phase difference between said formation measurement and said reference signal, whereby a measurement of the phase difference is produced; and
      selecting between measurement of the phase difference between said formation measurement and said reference signal for large phase differences and measurement of the impedance amplitude of said formation measurement for small phase differences, whereby a characterization of the geologic formation is produced.

2. The method of claim 1 wherein said step of determining the phase difference between said formation measurement and said reference signal comprises the step of:
   measuring the voltage of said introduced current when the voltage of said reference signal is approximately zero.

3. The method of claim 1 wherein said differentiation step comprises the step of:
   determining the impedance amplitude of said formation measurement.

4. The method of claim 1 wherein said introduced current is provided through at least one of a plurality of electrodes disposed in the wellbore.

5. The method of claim 1 wherein said introduced current is an alternating current.

6. The method of claim 1 wherein:
   said step of determining the electrical properties of a current introduced into the geologic formation from a wellbore comprises the steps of:
      introducing an alternating electrical current into the wellbore using an electrode in electrical contact with the wellbore fluids, thereby inducing a current into the geologic formation;
      measuring the alternating voltage of said introduced alternating electrical current, thereby producing a first measured voltage; and
      measuring the current of said introduced alternating electrical current, thereby producing a first measured current; and
   said determining the electrical properties of said current introduced into the geologic formation through a portion of said wellbore comprises the step of:
      measuring the differential alternating voltage of said introduced alternating electrical current between said electrode and an electrically conductive plate disposed between said electrode and the geologic formation, thereby producing a second measured voltage.

7. The method of claim 6 wherein said step of differentiating said formation measurement from said reference signal comprises the step of correlating said first measured voltage with said second measured voltage, thereby producing a phase shift measurement.

8. The method of claim 6 wherein said step of differentiating said formation measurement from said reference signal comprises the step of dividing said first measured current into said first measured voltage when the non direct current component of said second measured voltage is approximately zero.

9. The method of claim 6 wherein said step of differentiating said formation measurement from said reference signal comprises the step of selecting at least between:
   correlating said first measured voltage with said second measured voltage, thereby producing a phase shift measurement; and
   dividing said first measured current into said first measured voltage when the non direct current component of said second measured voltage is approximately zero.

10. The method of claim 6 wherein said plate is an electrically conductive lattice.

11. The method of claim 6 wherein introducing an alternating electrical current into the wellbore using an electrode comprises introducing an alternating electrical current into the wellbore using a plurality of electrodes and wherein measuring the differential alternating voltage of said introduced alternating electrical current between said electrode and an electrically conductive plate comprises measuring the differential alternating voltage of said introduced alternating electrical current between said plurality of electrodes and a plurality of electrically conductive plates, each of said plurality of electrically conductive plates positioned respective to at least one of said plurality of electrodes, wherein the plates of said plurality of electrically conductive plates are separated from each other by an insulating material.

12. A method for characterizing a geologic formation comprising the steps of:
  determining the electrical properties of a current introduced into the geologic formation from a wellbore, thereby producing a formation measurement;
  determining the electrical properties of said current introduced into the geologic formation through a portion of said wellbore, thereby producing a reference signal; and
  differentiating said formation measurement from said reference signal, wherein:
  said step of determining the electrical properties of a current introduced into the geologic formation from a wellbore comprises the steps of:
    introducing an alternating electrical current into the wellbore using an electrode in electrical contact with the wellbore fluids, thereby inducing a current into the geologic formation;
    measuring the alternating voltage of said introduced alternating electrical current, thereby producing a first measured voltage; and
    measuring the current of said introduced alternating electrical current, thereby producing a first measured current; and
  said determining the electrical properties of said current introduced into the geologic formation through a portion of said wellbore comprises the step of:
    measuring the differential alternating voltage of said introduced alternating electrical current between said electrode and an electrically conductive plate disposed between said electrode and the geologic formation, thereby producing a second measured voltage.

13. The method of claim 12 wherein said step of differentiating said formation measurement from said reference signal comprises the step of correlating said first measured voltage with said second measured voltage, thereby producing a phase shift measurement.

14. The method of claim 12 wherein said step of differentiating said formation measurement from said reference signal comprises the step of dividing said first measured current into said first measured voltage when the non direct current component of said second measured voltage is approximately zero.

15. The method of claim 12 wherein said step of differentiating said formation measurement from said reference signal comprises the step of selecting at least between:
  correlating said first measured voltage with said second measured voltage, thereby producing a phase shift measurement; and
  dividing said first measured current into said first measured voltage when the non direct current component of said second measured voltage is approximately zero.

16. The method of claim 12 wherein said plate is an electrically conductive lattice.

17. The method of claim 12 wherein introducing an alternating electrical current into the wellbore using an electrode comprises introducing an alternating electrical current into the wellbore using a plurality of electrodes and wherein measuring the differential alternating voltage of said introduced alternating electrical current between said electrode and an electrically conductive plate comprises measuring the differential alternating voltage of said introduced alternating electrical current between said plurality of electrodes and a plurality of electrically conductive plates, each of said plurality of electrically conductive plates positioned respective to at least one of said plurality of electrodes, wherein the plates of said plurality of electrically conductive plates are separated from each other by an insulating material.

\* \* \* \* \*